(12) United States Patent
Fujii et al.

(10) Patent No.: US 10,293,719 B2
(45) Date of Patent: May 21, 2019

(54) AIR CONDITIONER FOR VEHICLE SEAT

(71) Applicant: DENSO CORPORATION, Kariya, Aichi-pref. (JP)

(72) Inventors: Takahisa Fujii, Chiryu (JP); Yasuhiko Niimi, Handa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1257 days.

(21) Appl. No.: 14/462,925

(22) Filed: Aug. 19, 2014

(65) Prior Publication Data

US 2015/0056906 A1 Feb. 26, 2015

(30) Foreign Application Priority Data

Aug. 22, 2013 (JP) ................................ 2013-172271

(51) Int. Cl.
*B60N 2/56* (2006.01)
(52) U.S. Cl.
CPC ........... *B60N 2/5628* (2013.01); *B60N 2/565* (2013.01); *B60N 2/5657* (2013.01)
(58) Field of Classification Search
CPC ..... B60N 2/5628; B60N 2/565; B60N 2/5657
USPC .................................................. 454/120, 75
See application file for complete search history.

(56) References Cited

U.S. PATENT DOCUMENTS

| 1,981,011 | A | * | 11/1934 | Vernet ...................... | B60H 1/20 |
| | | | | | 165/41 |
| 2,249,946 | A | * | 7/1941 | Darrah ............... | B60H 1/00464 |
| | | | | | 165/125 |
| 4,118,062 | A | * | 10/1978 | Harder, Jr. ......... | B60H 1/00457 |
| | | | | | 296/63 |
| 4,259,896 | A | * | 4/1981 | Hayashi ................. | B60H 1/246 |
| | | | | | 297/180.14 |
| 4,460,036 | A | * | 7/1984 | Yoshimi ............. | B60H 1/00842 |
| | | | | | 165/203 |
| 6,059,018 | A | * | 5/2000 | Yoshinori .......... | B60H 1/00285 |
| | | | | | 165/41 |

(Continued)

FOREIGN PATENT DOCUMENTS

| JP | 2007-308045 | 11/2007 |
| JP | 2010-215228 | 9/2010 |
| JP | 2011-506178 | 3/2011 |

*Primary Examiner* — Steven B McAllister
*Assistant Examiner* — Samantha Probst
(74) *Attorney, Agent, or Firm* — Harness, Dickey & Pierce, P.L.C.

(57) ABSTRACT

An air conditioner for a vehicle seat has: a centrifugal fan; a first case housing the fan and including a fan inlet and a fan outlet; and a second case providing an inlet-side air passage and an outlet-side air passage. The second case has; an inside-air inlet introducing air from a surface of the vehicle seat into the inlet-side air passage; a conditioned-air inlet introducing conditioned air from an air conditioning unit for a passenger compartment into the inlet-side air passage; a conditioned-air outlet through which air in the outlet-side air passage flows to the surface of the vehicle seat; and an exhaust-air outlet through which air in the outlet-side air passage flows out of the second case. The second case includes: an inlet-side switching door that selectively opens or closes the inside-air inlet and the conditioned-air inlet; and an outlet-side switching door that selectively opens or closes the conditioned-air outlet and the exhaust-air outlet.

13 Claims, 8 Drawing Sheets

(56) References Cited

U.S. PATENT DOCUMENTS

| | | | | |
|---|---|---|---|---|
| 6,186,886 B1* | 2/2001 | Farrington | | B60H 1/243 |
| | | | | 454/124 |
| 6,196,308 B1* | 3/2001 | Halligan | | B60H 1/00378 |
| | | | | 165/127 |
| 7,261,372 B2* | 8/2007 | Aoki | | B60N 2/5635 |
| | | | | 297/180.13 |
| 7,281,574 B2* | 10/2007 | Shibata | | B60H 1/00064 |
| | | | | 165/203 |
| 7,503,625 B2* | 3/2009 | Bargheer | | B60H 1/3407 |
| | | | | 297/180.12 |
| 7,621,135 B2* | 11/2009 | Kadle | | B60N 2/5635 |
| | | | | 454/120 |
| 7,708,626 B2* | 5/2010 | Bargheer | | B60N 2/5635 |
| | | | | 297/217.1 |
| 8,465,350 B2* | 6/2013 | Kilian | | B60H 1/00492 |
| | | | | 429/433 |
| 8,633,424 B2* | 1/2014 | Chernyavsky | | B60H 1/12 |
| | | | | 165/202 |
| 8,888,573 B2* | 11/2014 | Bajic | | B60N 2/5635 |
| | | | | 297/180.1 |
| 8,899,311 B2* | 12/2014 | Misumi | | B60H 1/00742 |
| | | | | 165/202 |
| 8,944,145 B2* | 2/2015 | Esaki | | B60H 1/00285 |
| | | | | 165/202 |
| 9,016,069 B2* | 4/2015 | Jun | | F25B 21/04 |
| | | | | 62/3.4 |
| 9,371,024 B2* | 6/2016 | Ichishi | | B60N 2/5628 |
| 2001/0004008 A1* | 6/2001 | Aoki | | B60H 1/00285 |
| | | | | 165/43 |
| 2003/0013407 A1* | 1/2003 | Gagnon | | F04D 25/166 |
| | | | | 454/237 |
| 2004/0067727 A1* | 4/2004 | Aoki | | B60H 1/00285 |
| | | | | 454/120 |
| 2004/0107713 A1* | 6/2004 | Aoki | | B60H 1/00064 |
| | | | | 62/208 |
| 2004/0198212 A1* | 10/2004 | Aoki | | B60H 1/00285 |
| | | | | 454/120 |
| 2008/0191520 A1* | 8/2008 | Hartmann | | B60N 2/5635 |
| | | | | 297/180.12 |
| 2008/0315634 A1* | 12/2008 | Hartmann | | B60N 2/5635 |
| | | | | 297/180.14 |
| 2009/0031742 A1* | 2/2009 | Seo | | B60N 2/5628 |
| | | | | 62/244 |
| 2010/0240292 A1 | 9/2010 | Zhang | | |
| 2010/0314071 A1* | 12/2010 | Lee | | B60H 1/00285 |
| | | | | 165/59 |
| 2010/0327637 A1 | 12/2010 | Bajic et al. | | |
| 2012/0129440 A1* | 5/2012 | Kitaguchi | | B60K 1/04 |
| | | | | 454/120 |
| 2012/0315132 A1* | 12/2012 | Axakov | | B60N 2/5635 |
| | | | | 415/182.1 |
| 2013/0052929 A1* | 2/2013 | Eisenhour | | B60H 1/00742 |
| | | | | 454/75 |
| 2013/0165033 A1* | 6/2013 | Fitzpatrick | | B60H 1/00285 |
| | | | | 454/120 |
| 2014/0159442 A1* | 6/2014 | Helmenstein | | B60N 2/5671 |
| | | | | 297/180.14 |
| 2014/0179212 A1* | 6/2014 | Space | | B60N 2/565 |
| | | | | 454/76 |

* cited by examiner

AIR CONDITIONER FOR VEHICLE SEAT

CROSS REFERENCE TO RELATED APPLICATION

This application is based on Japanese Patent Application No. 2013-172271 filed on Aug. 22, 2013, the disclosure of which is incorporated herein by reference in its entirety.

TECHNICAL FIELD

The present disclosure relates to an air conditioner for a vehicle seat.

BACKGROUND

Conventionally, an air conditioner for a vehicle seat is known to switch between an intake mode for drawing air through a surface of the vehicle seat and a blowing mode for blowing air out through the surface of the vehicle seat (see JP 2010-215228 A corresponding to US 2010/0240292 A1).

The air conditioner for a vehicle seat is generally required to have a flat shape since the air conditioner for a vehicle seat is generally disposed in a small space in a back part of the vehicle seat, or under the vehicle seat. Accordingly, a whole of the air conditioner for a vehicle seat is also required to have a flat shape when the air conditioner for a vehicle seat that switches between the intake mode and the blowing mode is embodied.

SUMMARY

The present disclosure addresses the above issues. Thus, it is an objective of the present disclosure to provide an air conditioner for a vehicle seat that switches between an intake mode and a blowing mode and that a whole of the air conditioner for a vehicle can be formed in a flat shape.

To achieve the above issues, according to a first aspect of the present disclosure, the air conditioner for a vehicle seat has a centrifugal fan, a first case, and a second case. The centrifugal fan has a fan shaft. The first case houses the fan and includes a fan inlet drawing air and a fan outlet blowing air. The second case provides an inlet-side air passage connecting to the fan inlet and an outlet-side air passage connecting to the fan outlet. The second case has an inside-air inlet, a conditioned-air inlet, a conditioned-air outlet, and an exhaust-air outlet. The inside-air inlet introduces air that is drawn from a surface of the vehicle seat into the inlet-side air passage. The conditioned-air inlet introduces conditioned air from an air conditioning unit that performs an air conditioning for a passenger compartment into the inlet-side air passage. Air flowing in the outlet-side air passage flows to the surface of the vehicle seat through the conditioned-air outlet. Air flowing in the outlet-side air passage flows out of the second case through the exhaust-air outlet. The second case includes: an inlet-side switching door that selectively opens or closes the inside-air inlet and the conditioned-air inlet; and an outlet-side switching door that selectively opens or closes the conditioned-air outlet and the exhaust-air outlet. The conditioned-air outlet is located on a virtual line that extends along a blowing direction of air from the fan outlet. The inside-air inlet is arranged adjacent to the conditioned-air outlet in a direction perpendicular to an axial direction of the fan shaft.

Alternatively, according to a second aspect of the present disclosure, the conditioned-air outlet may be arranged such that at least a part of a projection image of the conditioned-air outlet that is projected relative to the first case in a direction perpendicular to an axial direction of the fan shaft overlaps the fan outlet.

Accordingly, since the inside-air inlet is adjacent to the conditioned-air outlet in the direction perpendicular to the axial direction of the fan shaft, a length of the second case in the axial direction can be shortened compared to a case that the inside-air inlet is adjacent to the conditioned-air outlet in the axial direction. Thus, the air conditioner for a vehicle seat can have a flat shape as a whole.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
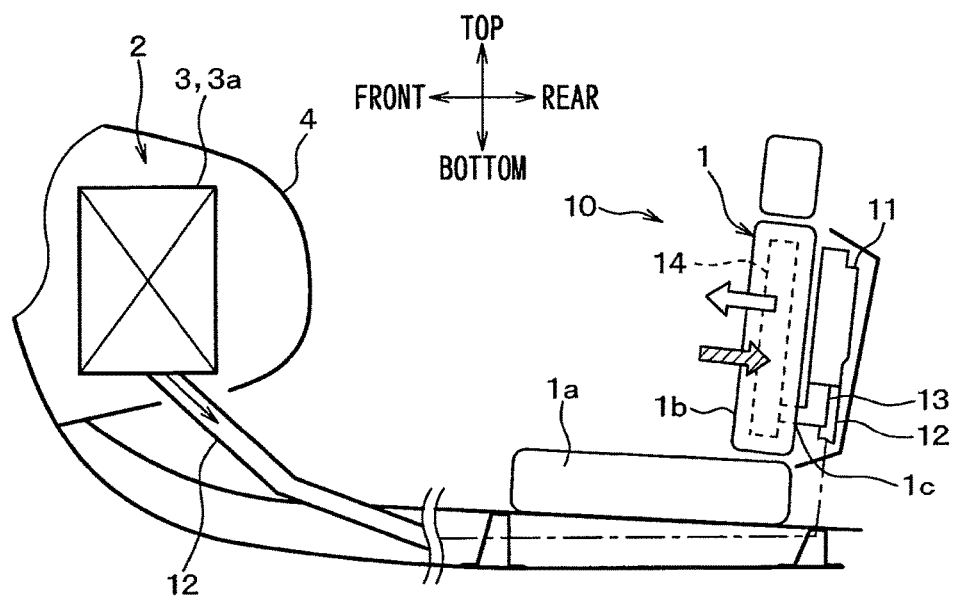
FIG. 1 is a diagram illustrating a side view of an air conditioner for a vehicle seat according to a first embodiment.

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

In the drawings, a top-bottom direction, a front-rear direction, a left-right direction correspond to a vehicle top-bottom direction, a vehicle front-rear direction, a vehicle left-right direction, respectively.

First Embodiment

As shown in FIG. 1, an air conditioner 10 for a vehicle seat has a blowing unit (i.e., an air conditioning unit for a vehicle seat) 11, an air duct (i.e., an air-conditioning duct for the vehicle seat) 12, and a connecting duct 13. The vehicle seat will be referred to as a seat 1 hereinafter.

The seat 1 has a bottom part 1a and a back part 1b. An air passage 14 is provided inside of the back part 1b. The blowing unit 11 is disposed adjacent to a rear surface of the back part 1b. The air passage 14 and the blowing unit 11 are communicated with each other through the connecting duct 13.

The air duct 12 is connected to the blowing unit 11 and an air conditioning unit 3 for a passenger compartment such that the air conditioning unit 3 and the blowing unit 11 are communicated with each other through the air duct 12. The air conditioning unit 3 is used for a vehicle air conditioner 2. The air duct 12 introduces conditioned air that is conditioned at the air conditioning unit 3 from the air conditioning unit 3 to the blowing unit 11. The air conditioning unit 3 is located inside of an instrument panel 4 that is located at the forefront in the passenger compartment. The air conditioning unit 3 has an air-conditioning case 3a. The air-conditioning case 3a therein houses various air-conditioning devices such as a blower, an evaporator, and a heater core for a refrigerant cycle. The air conditioning unit 3 adjusts air to have a desired temperature and provides the air as the conditioned air, and the conditioned air is blown into the passenger compartment through an outlet (not shown).

The blowing unit 11 is capable of switching between an intake mode and a blowing mode. Specifically, as shown in FIGS. 2 to 6, the blowing unit 11 includes a blower 15 and a switching device 16.

Figure 5:
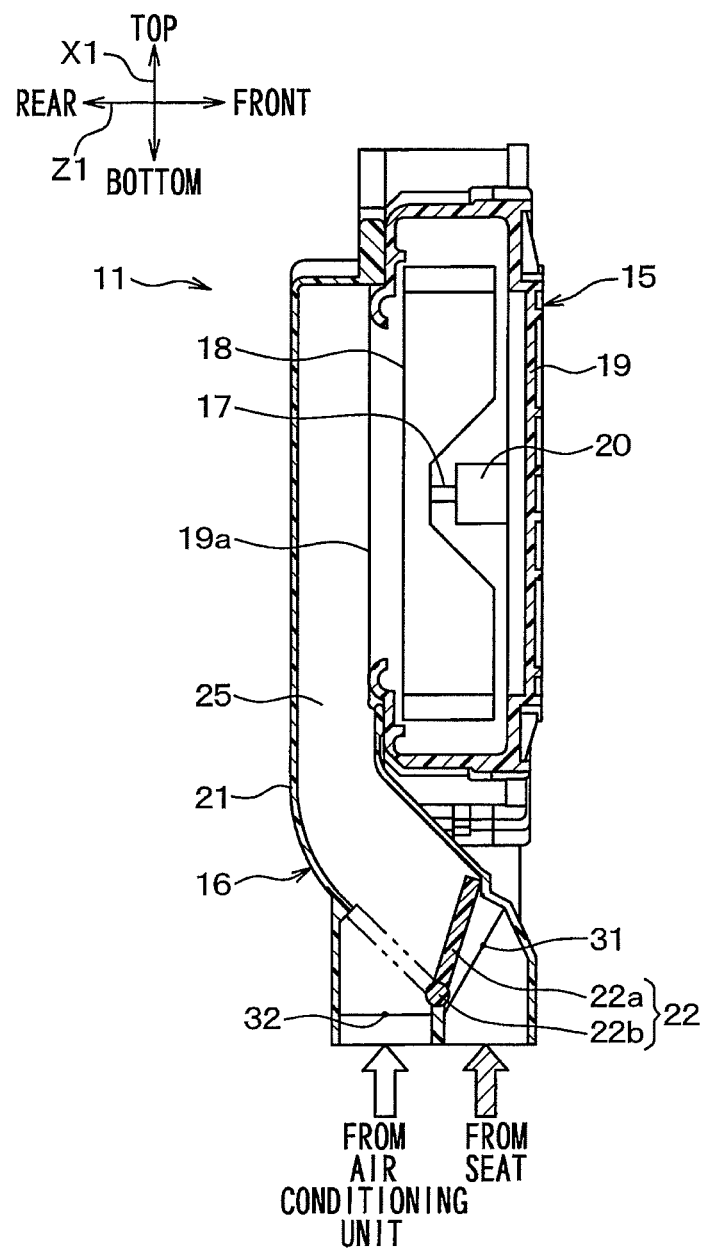
FIG. 5 is a cross-sectional view taken along a line V-V shown in FIG. 4.

As shown in FIG. 5, the blower 15 includes a centrifugal fan 18 having a fan shaft 17 and a first case 19 housing the fan 18 therein. The fan shaft 17, the fan 18, and the first case 19 are made of synthetic resin.

Figure 6:
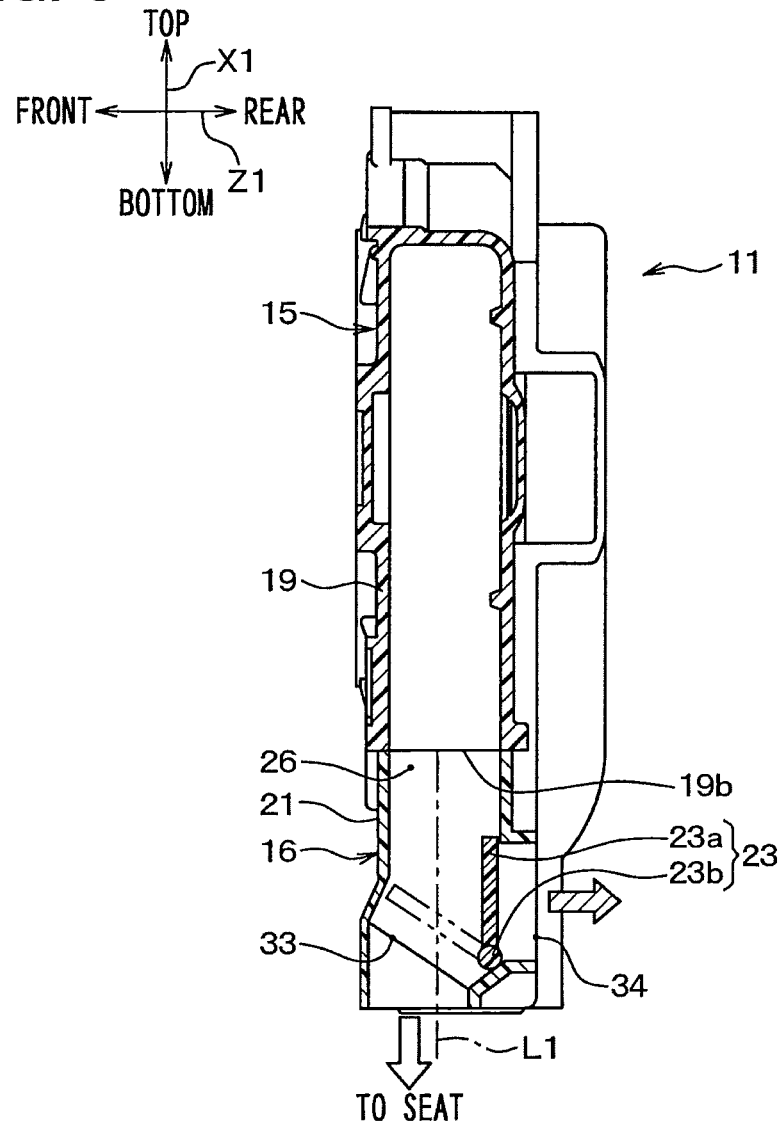
FIG. 6 is a cross-sectional view taken along a line VI-VI shown in FIG. 4.

The fan shaft 17 is operated by an electric motor 20 to rotate. An air passage (not shown) is provided in the first case 19 such that the air passage is formed in a spiral shape and located at an outer periphery part of the fan 18. As shown in FIGS. 5 and 6, the first case 19 has a fan inlet 19a and a fan outlet 19b. The fan inlet 19a is located at a side of the fan shaft 17 in an axial direction Z1 of the fan shaft 17 such that air is drawn into the first case 19 through the fan inlet 19a. The axial direction Z1 is, in other words, a rotation-axis direction of the fan 18. The fan outlet 19b is located radially outward of the fan 18 such that the air blows out of the first case 19 through the fan outlet 19b.

Figure 2:
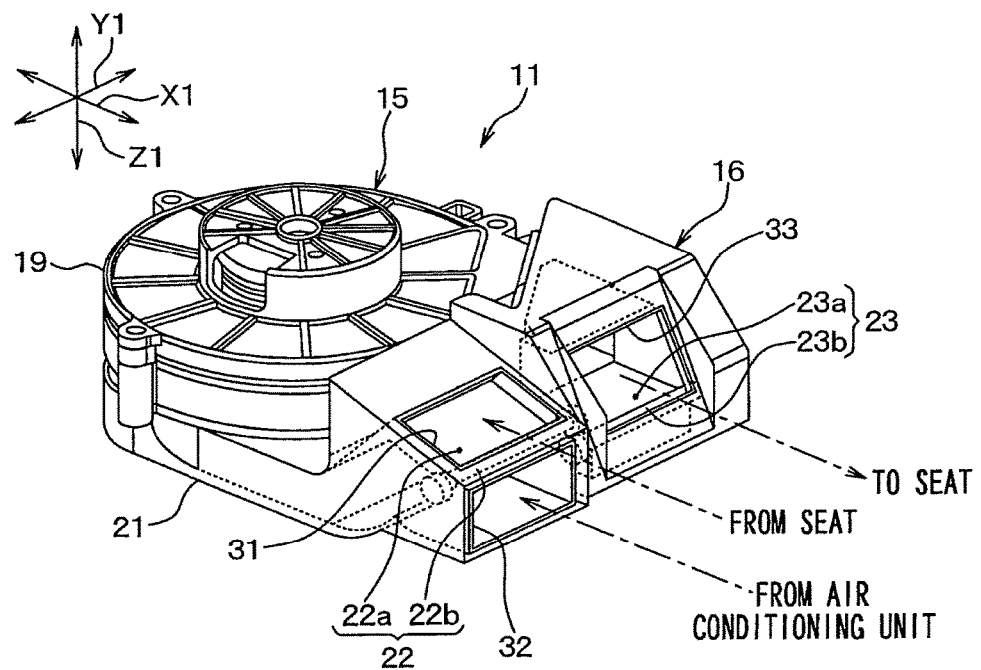
FIG. 2 is a perspective view illustrating a blowing unit of the air conditioner for a vehicle seat.
Figure 3:
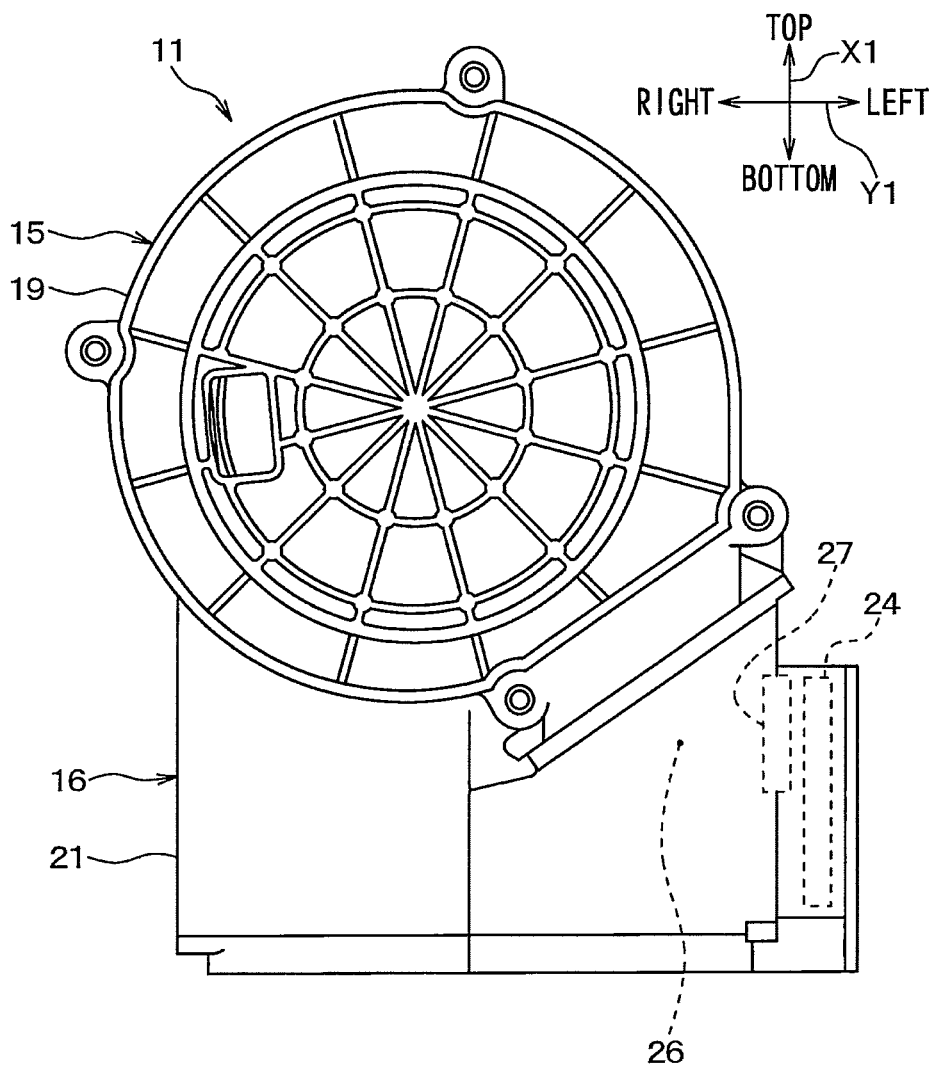
FIG. 3 is atop view illustrating the blowing unit.
Figure 4:
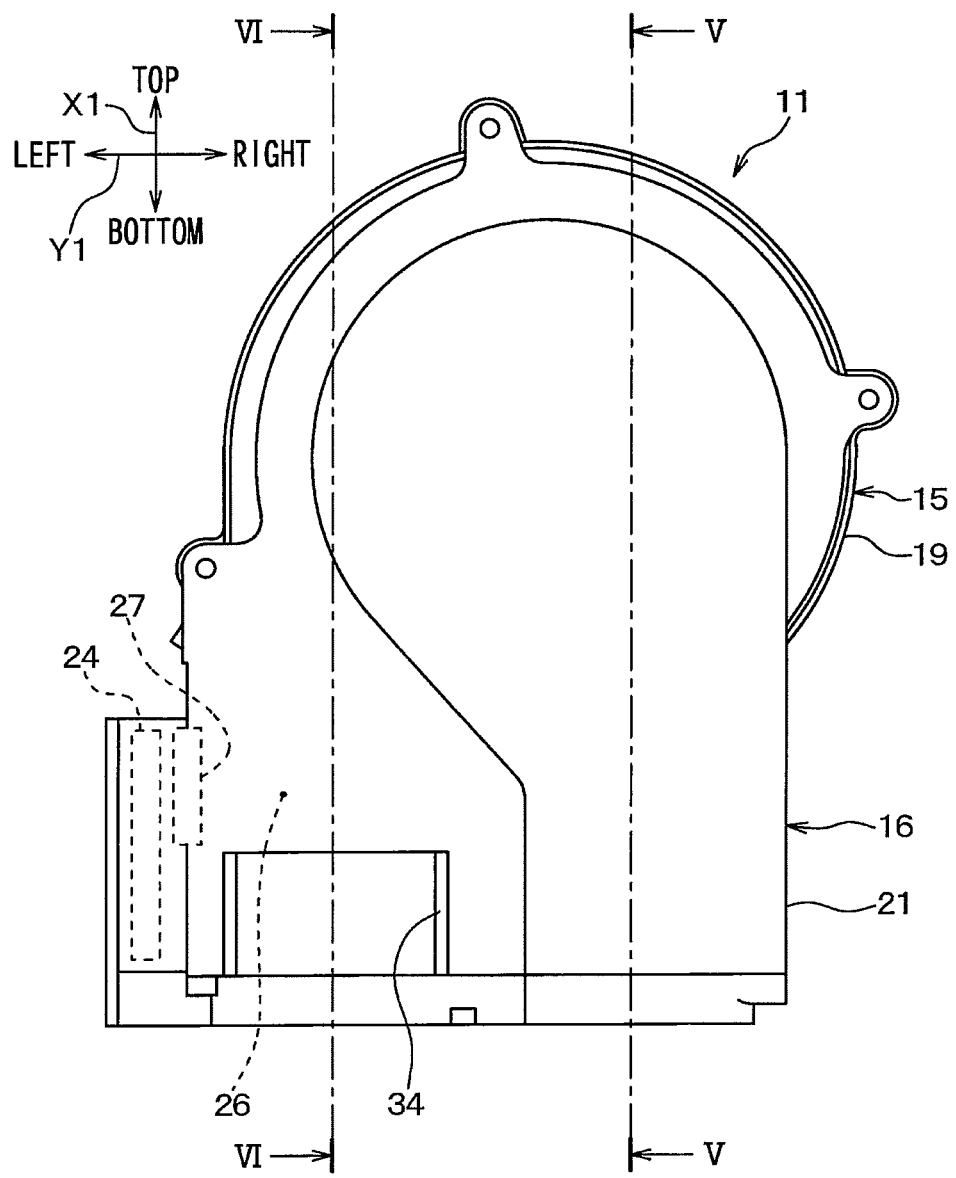
FIG. 4 is a bottom view illustrating the blowing unit.

As shown in FIGS. 2 to 4, the switching device 16 includes a second case 21, an inlet-side switching door 22, an outlet-side switching door 23, and a bimetal 24. The bimetal 24 performs as an actuator and operates the inlet-side switching door 22 and the outlet-side switching door 23 to rotate. The second case 21, the inlet-side switching door 22, and the outlet-side switching door 23 are made of synthetic resin.

The first case 19 and the second case 21 are connected to each other such that an inlet-side air passage 25 that is communicated with a fan inlet 19a is provided as shown in FIG. 5. Furthermore, the first case 19 and the second case 21 are connected to each other such that an outlet-side air passage 26 that is communicated with a fan outlet 19b is provided as shown in FIG. 6.

As shown in FIGS. 2 and 5, the second case 21 has an inside-air inlet 31 and a conditioned-air inlet 32. The inside-air inlet 31 introduces air that is drawn from a surface of the seat 1 into the inlet-side air passage 25. The conditioned-air inlet 32 introduces the conditioned air that flows from the air conditioning unit 3 to flow into the outlet-side air passage 25.

As shown in FIGS. 2 and 6, the second case 21 further has a conditioned-air outlet 33 and an exhaust-air outlet 34. Air flowing in the outlet-side air passage 26 is blown from the surface of the seat 1 through the conditioned-air outlet 33, or flows out of the second case 21 through the exhaust-air outlet 34. In embodiments of the present disclosure, the inside-air inlet 31, the conditioned-air inlet 32, the conditioned-air outlet 33, and the exhaust-air outlet 34 include parts that are directly opened or closed at least by various switching door. FIGS. 5 and 6 show ducts connecting to the inside-air inlet 31, the conditioned-air inlet 32, and the conditioned-air outlet 33, respectively.

As shown in FIG. 6, the conditioned-air outlet 33 is located on a virtual line L1 that extends along a blowing direction of air from the fan outlet 19b of the first case 19. Accordingly, the outlet-side air passage 26 extends in a straight line from the fan outlet 19b of the first case 19. The exhaust-air outlet 34 is located at a side of the fan inlet 19a in the second case 21 in the axial direction Z1, that is, the exhaust-air outlet 34 is located at a rear side in the second case 21. Thus, air flows to a rear side in the vehicle through the exhaust-air outlet 34.

The conditioned-air outlet 33 may be only required to be arranged such that at least a part of a projection image of the conditioned-air outlet 33 that is projected relative to the first case 19 in a direction perpendicular to the axial direction Z1 overlaps the fan outlet 19b of the first case 19.

As shown in FIG. 2, the inside-air inlet 31 is adjacent to the conditioned-air outlet 33 in a direction Y1 perpendicular to the axial direction Z1 of the fan shaft 17. The direction Y1 is perpendicular to both of the axial direction Z1 and a flow direction X1 along which air flows from the fan outlet 19b. Accordingly, a flow direction of air flowing into the blowing unit 11 through the inside-air inlet 31 is opposite to a flow direction of air flowing out of the blowing unit 11 through the conditioned-air outlet 33. Further, the conditioned-air outlet 32 is adjacent to the inside-air inlet 31 in the axial direction Z1.

Therefore, in the blowing unit 11, air that flows into the blowing unit 11 from the inside-air inlet 31 or the conditioned-air inlet 32 is U-turned and flows to the conditioned-air outlet 33.

As shown in FIGS. 2 and 5, the inlet-side switching door 22 is disposed in the second case 21 and selectively opens or closes the inside-air inlet 31 and the conditioned-air inlet 32. According to the present embodiment, the inlet-side switching door 22 is a single plate door. The plate door is supported at one side of the plate door and has a high rigidity. The plate door has a plate part 22a that is hardly bent and a door shaft (i.e., a first door shaft) 22b located at a side of the plate part 22a that is the same side as the side of the plate door at which the plate door is supported.

As shown in FIGS. 2 and 6, the outlet-side switching door 23 is disposed in the second case 21 and selectively opens or closes the conditioned-air outlet 33 and the exhaust-air outlet 34. According to the present embodiment, the outlet-side switching door 23 is a single plate door. The plate door is also supported at one side and has a plate part 23a and a door shaft (i.e., a second door shaft) 23b, similar to the inlet-side switching door 22.

Figure 7:
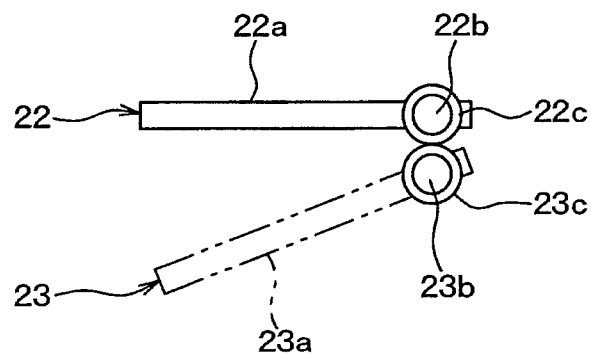
FIG. 7 is a view illustrating a state that an intake-side switching door and a blowing-side switching door are connected to each other, according to the first embodiment.

As shown in FIG. 2, the inlet-side switching door 22 and the outlet-side switching door 23 are adjacent to each other in an axial direction of the door shafts 22b, 23b. As shown in FIG. 7, the door shaft 22b and the door shaft 23b are connected to each other through a first gear 22c and a second gear 23c. According to the present embodiment, a direction to which the first gear 22c rotates the inlet-side switching door 22 is different from a direction to which the second gear 23c rotates the outlet-side switching door 23. However, the direction to which the first gear 22c rotates the inlet-side switching door 22 may be the same direction as the direction to which the second gear 23c rotates the outlet-side switching door 23. In this case, for example, a location of the inside-air inlet 31 and a location of the conditioned-air inlet 32 may be reversed.

Figure 8:
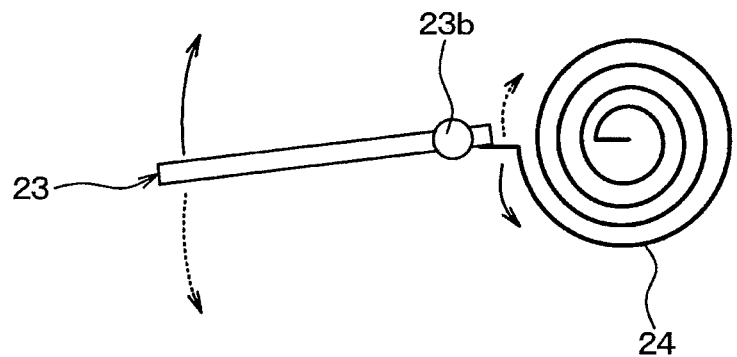
FIG. 8 is a schematic view illustrating an actuator according to the first embodiment.

The bimetal 24 is connected to one of the inlet-side switching door 22 and the outlet-side switching door 23. According to the present embodiment, the bimetal 24 is connected to the outlet-side switching door 23, as shown in FIG. 8. However, the bimetal 24 may be connected to the inlet-side switching door 22.

The bimetal 24 of the present embodiment consists of two metal plates and has a spiral shape. Specifically, the two metal plates that are different from each other in coefficient of thermal expansion are coupled to have a single plate shape, and the single plate consisted of the two metal plates is wound to form the spiral shape. The spiral shape varies depending on temperature around the bimetal 24. As shown in FIGS. 3 and 4, the bimetal 24 is housed in a chamber that is separated from the outlet-side air passage 26 of the second case 21 by a partition wall. The partition wall has an opening 27, and air flows through the opening 27 and blows to the bimetal 24.

Accordingly, the spiral shape of the bimetal 24 varies depending on an air temperature flowing in the second case 21. Both of the inlet-side switching door 22 and the outlet-side switching door 23 can be operated rotatably due to such a shape change of the bimetal 24.

According to the present embodiment, the bimetal 24 is set such that the inlet-side switching door 22 and the outlet-side switching door 23 are located at predetermined locations, respectively, depending on temperature of air in the second case 21, as described below. When the air temperature is higher than a predetermined temperature, the blowing unit 11 operates in a first mode. In the first mode, the inlet-side switching door 22 opens the inside-air inlet 31 and closes the conditioned-air inlet as shown by a two-dot line in FIG. 5. In the first mode, the outlet-side switching door 23 closes the conditioned-air outlet 33 and opens the exhaust-air outlet 34 as shown by a two-dot line in FIG. 6. On the other hand, when the air temperature is lower than the predetermined temperature, the blowing unit 11 operates in a second mode. In the second mode, the outlet-side switching door 23 opens the conditioned-air outlet 33 and closes the exhaust-air outlet 34 as shown by a solid line in FIG. 6, and the inlet-side switching door 22 closes the inside-air inlet 31 and opens the conditioned-air inlet 32 as shown by a solid line in FIG. 5. In this case, the predetermined temperature is for example, 50° C.

The blowing unit 11 is disposed at the back part 1b of the seat 1 as shown in FIGS. 2 to 6. The axial direction Z1 of the fan shaft 17 corresponds to the front-rear direction. The direction Y1 perpendicular to the axial direction Z1 corresponds to the vehicle left-right direction. The flow direction X1 along which air flows from the fan outlet 19b corresponds to the vehicle top-bottom direction.

Figure 9:
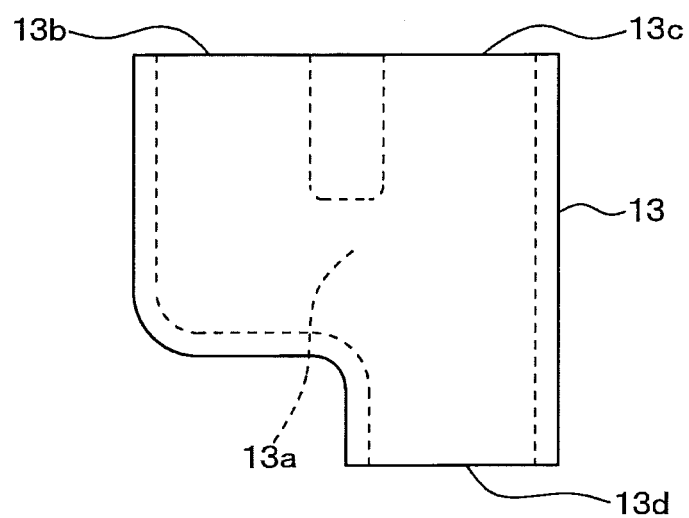
FIG. 9 is an external view illustrating a connecting duct according to the first embodiment.

The inside-air inlet 31 and the conditioned-air outlet 33 are connected to the connecting duct 13 that includes a junction part 13a shown in FIG. 9. Specifically, the connecting duct 13 includes a first connecting port 13b and a second connecting port 13c at one side of the connecting duct 13. The inside-air inlet 31 is connected to the first connecting port 13b, and the conditioned-air outlet 33 is connected to the second connecting port 13c. The connecting duct 13 further includes a third connecting port 13d at the other side of the connecting duct 13 that is opposite to the side including the first connecting port 13b and the second connecting port 13c. The third connecting port 13d is connected to a seat-side connecting port 1c that is provided at the seat 1, as shown in FIG. 1. Furthermore, the conditioned-air inlet 32 of the blowing unit 11 is connected to the air duct 12.

An operation mode of the air conditioner 10 for a vehicle seat will be described hereafter.

For example, when the vehicle is parked in the scorching summer sun, a temperature in the passenger compartment may become higher than 50° C., and the seat 1 and the air duct 12 may store heat (i.e., a thermal mass) and have high temperature. When air blows from the surface of the seat 1 in such a state, a passenger feels uncomfortable since the air is heated.

In the above state, according to the present embodiment, the air conditioner 10 for a vehicle seat performs in the first mode that inside air in the passenger compartment is drawn to the air conditioner 10 for a vehicle seat through the surface of the seat 1. That is, when the temperature in the passenger compartment is high, the inlet-side switching door 22 and the outlet-side switching door 23 are moved to positions of the first mode shown by the two-dot lines in FIGS. 5 and 6 due to the bimetal 24, since the air temperature in the blowing unit 11 is higher than the predetermined temperature.

Accordingly, by operating the fan 18, the inside air is drawn into the blowing unit 11 through the surface of the seat 1 as shown by a shaded outline-arrow in FIGS. 1, 5, and 6. The inside air drawn into the blowing unit 11 flows through the inside-air inlet 31, the inlet-side air passage 25, the fan 18, the outlet-side air passage 26, and the exhaust-air outlet 34, in this order, and is emitted out from the exhaust-air outlet 34. Therefore, the passenger can be restricted from feeling uncomfortable due to heated air blown from the surface of the seat 1.

In the above case, the conditioned air blows from the air conditioning unit 3 to the passenger compartment in a cooling mode performed by the vehicle air conditioner 2.

After the heat (i.e., the thermal mass) stored in the seat 1 is cooled by continuing the operation of the first mode, the air conditioner 10 for a vehicle seat is operated in the second mode to blow the conditioned air from the surface of the seat 1. That is, the air temperature in the blowing unit 11 becomes lower than the predetermined temperature by cooling the heat that is stored in the seat 1 and by decreasing a temperature of the conditioned air that is blown to the passenger compartment. Accordingly, the inlet-side switching door 22 and the outlet-side switching door 23 are moved from the positions of the first mode to positions of the second mode shown by solid lines in FIGS. 5 and 6 due to a deforming of the bimetal 24.

Thus, as shown by an outline arrow in FIGS. 1, 5, and 6, the conditioned air from the air duct 12 flows through the conditioned-air inlet 32, the inlet-side air passage 25, the fan 18, the outlet-side air passage 26, and the conditioned-air outlet 33, in this order. Subsequently, the conditioned air is blown from the surface of the seat 1. Accordingly, since the cool conditioned air blows from the surface of the seat 1, the passenger can be made feel cool.

Effects of the air conditioner 10 for a vehicle seat will be described hereafter.

According to the present embodiment, the conditioned-air outlet 33 is located on a virtual line L1 that extends along the blowing direction of air blowing from the fan outlet 19b of the first case 19. Thus, a pressure loss of air to be blown into the passenger compartment can be minimized between the fan outlet 19b and the conditioned-air outlet 33.

The inside-air inlet 31 is adjacent to the conditioned-air outlet 33 in the direction Y1 perpendicular to the axial direction Z1 of the fan shaft 17. That is, when the axial direction Z1 is defined as a height direction Z1 and when the direction Y1 perpendicular to the axial direction Z1 is defined as a horizontal direction Y1, the inside-air inlet 31 and the conditioned-air outlet 33 are adjacent to each other in the horizontal direction Y1. The inside-air inlet 31 and the conditioned-air outlet 33 are arranged in the height direction Z1 such that the inside-air inlet 31 and the conditioned-air outlet 33 overlap partly with each other, when the inside-air inlet 31 and the conditioned-air outlet 33 are projected in the horizontal direction Y1.

Thus, the second case 21 can be downsized in a height dimension and can have a flat shape, compared to a case that the inside-air inlet 31 and the conditioned-air outlet 33 are arranged adjacent to each other in the height direction Z1. Further, the connecting duct 13 through which both of the inside-air inlet 31 and the conditioned-air outlet 33 are connected to the seat-side connecting port 1c can have a flat shape. Therefore, according to the present embodiment, the air conditioner 10 for a vehicle seat can have a flat shape as a whole.

When the inside-air inlet 31 and the conditioned-air outlet 33 are projected in the horizontal direction Y1, the inside-air inlet 31 and the conditioned-air outlet 33 overlap partly with each other according to the present embodiment. However, the inside-air inlet 31 and the conditioned-air outlet 33 may overlap entirely with each other.

According to the present embodiment, the inside-air inlet 31 and the conditioned-air outlet 33 are adjacent to each other. Thus, a distance between the inside-air inlet 31 and the conditioned-air outlet 33 is short compared to a case that the inside-air inlet 31 and the conditioned-air outlet 33 are not adjacent to each other. Accordingly, a dimension of the connecting duct 13 in the horizontal direction Y1 can be shortened, and the connecting duct 13 can be downsized.

According to the present embodiment, a single plate door configures each of the inlet-side switching door 22 and the outlet-side switching door 23.

When the both of the inlet-side switching door 22 and the outlet-side switching door 23 are configured by another type of door such as a slide door and a rotary door, an extra space that is separate from an air passage provided in the second case 21 is required for movement of the door. Accordingly, a whole of the blowing unit 11 becomes larger.

Whereas, according to the present embodiment, the inlet-side air passage 25 in the second case 21 can house the inlet-side switching door 22, and the outlet-side air passage 26 in the second case 21 can house the outlet-side switching door 23. Thus, the whole of the blowing unit 11 can be downsized compared to a case that the extra space separate from the air passage is required for movement of the door.

According to the present embodiment, the inlet-side switching door 22 and the outlet-side switching door 23 are connected to each other through the gears 22c, 23c. The inlet-side switching door 22 and the outlet-side switching door 23 are operated by the single actuator. Thus, the number of components can be reduced compared to a case that separate actuators respectively operates the inlet-side switching door 22 and the outlet-side switching door 23.

According to the present embodiment, the mechanical bimetal 24 is used as the actuator. Thus, operating mechanisms of the inlet-side switching door 22 and the outlet-side switching door 23 can be made simple and reduced in cost compared to a case that an electric motor is used as the actuator.

Second Embodiment

Figure 10:
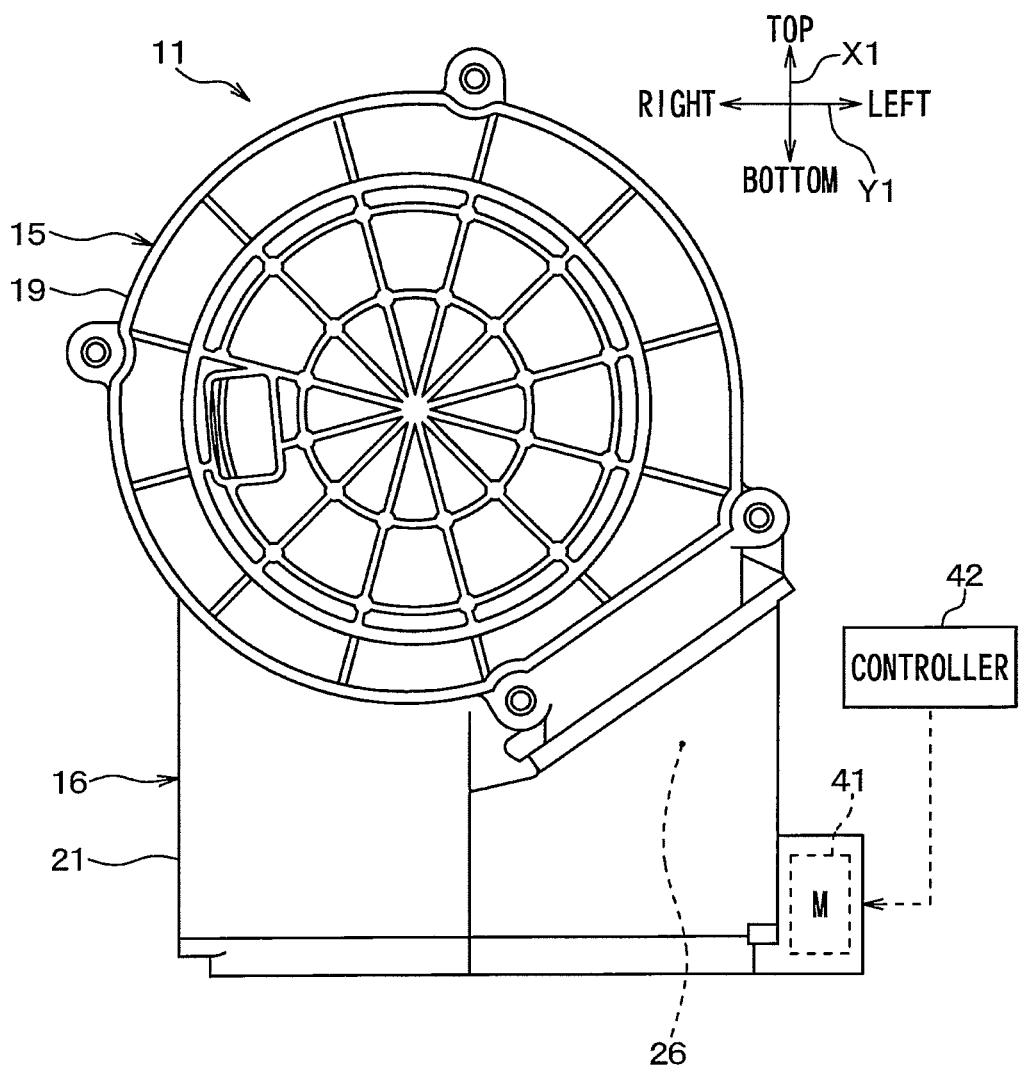
FIG. 10 is a top view illustrating a blowing unit of an air conditioner for a vehicle seat according to a second embodiment.

As shown in FIG. 10, in the air conditioner 10 for a vehicle seat of a second embodiment, an electric servomotor 41 is used as the actuator. The air conditioner 10 for a vehicle seat further has a controller 42 that controls an operation of the servomotor 41. Other configurations are similar to the first embodiment.

The servomotor 41 is housed in a chamber that is provided in the second case 21 to be separated from the outlet-side air passage 26 by a partition wall. The servomotor 41 is connected to an output side of the controller 42 and operated based on control signals from the controller 42.

The controller 42 operates the servomotor 41 by a timer control to set positions of the inlet-side switching door 22 and the outlet-side switching door 23. Specifically, the inlet-side switching door 22 and the outlet-side switching door 23 are set to the positions of the first mode from immediately after the fan 18 starts operating until a predetermined time elapses after the fan 18 starts operating. When the predetermined time elapses after the fan 18 starts operating, the inlet-side switching door 22 and the outlet-side switching door 23 are set to the positions of the second mode. As described in the first embodiment, the predetermined time is set such that the heat (i.e., the thermal mass) stored in the seat 1 can be cooled while the air conditioner 10 for a vehicle seat is operated in the first mode in a condition that the temperature in the passenger compartment is high.

Thus, according to the present embodiment, the air conditioner 10 for a vehicle seat operates in the first mode from immediately after the fan 18 starts operating until the predetermined time elapses after the fan 18 starts operating, and operates in the second mode, after the predetermined time elapses after the fan 18 starts operating. Therefore, according to the present embodiment, the passenger can be restricted from feeling uncomfortable due to heated air blown from the surface of the seat 1, similar to the first embodiment.

Third Embodiment

Figure 11:
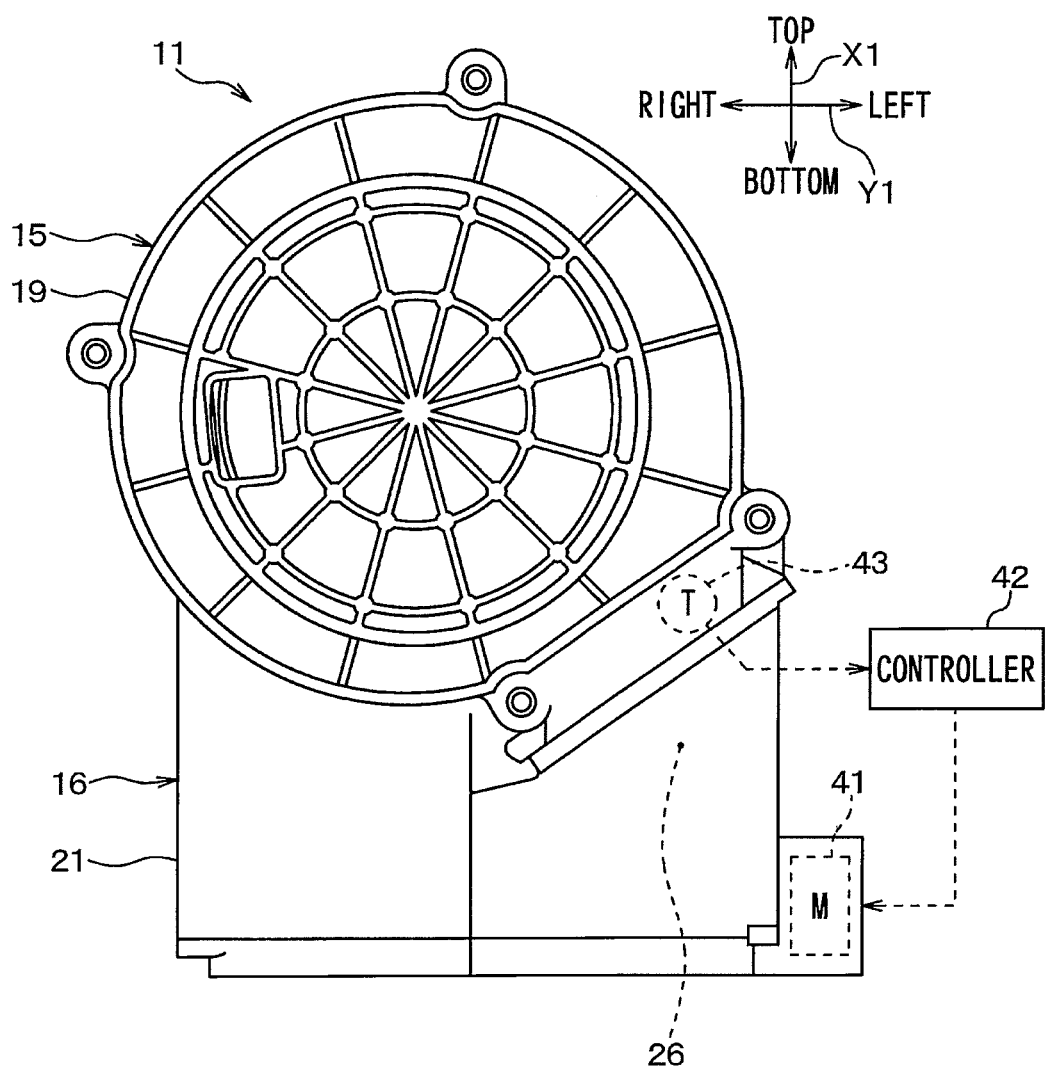
FIG. 11 is a top view illustrating a blowing unit of an air conditioner for a vehicle seat according to a third embodiment.

As shown in FIG. 11, according to a third embodiment, the electric servomotor 41 is used as the actuator. The air conditioner 10 for a vehicle seat has a temperature sensor 43 and the controller 42 that controls an operation of the servomotor 41. In the present embodiment, compared to the second embodiment, the temperature sensor 43 is further disposed in the air conditioner 10 for a vehicle seat, and the control process of the controller 42 is changed. A modification that is made with respect to the second embodiment will be described hereafter.

The temperature sensor 43 detects a temperature of air flowing in the blowing unit 11. According to the present embodiment, the temperature sensor 43 is disposed at the fan outlet 19b of the first case 19. A location at which the temperature sensor 43 is disposed may be another location as long as the location is inside the first case 19 or the second case 21. The temperature sensor 43 is connected to an input side of the controller 42 and outputs a detection result to the controller 42.

The controller 42 performs a control process that positions of the inlet-side switching door 22 and the outlet-side switching door 23 are set depending on the detection result from the temperature sensor 43. Specifically, the inlet-side switching door 22 and the outlet-side switching door 23 are set to the positions of the first mode when the air temperature is higher than the predetermined temperature. When the air temperature is lower than the predetermined temperature, the inlet-side switching door 22 and the outlet-side switching door 23 are set to the positions of the second mode. The predetermined temperature is, for example, 50° C.

Therefore, the air conditioner 10 for a vehicle seat works similarly to the first embodiment, and the passenger can be restricted from feeling uncomfortable due to heated air blown from the surface of the seat 1.

Other Embodiments

The present disclosure is not limited to the above embodiments, and can be modified within the scope of the present disclosure as defined by the appended claims.

(1) In the above embodiments, the single actuator operates the inlet-side switching door 22 and the outlet-side switching door 23. However, separate actuators may operate the inlet-side switching door 22 and the outlet-side switching door 23, respectively.

(2) In the above embodiments, each of the inlet-side switching door 22 and the outlet-side switching door 23 is configured by the plate door. However, each of the inlet-side switching door 22 and the outlet-side switching door 23 may be configured by another door such as a film-type slide door that is capable of being curved.

(3) In the above embodiments, air blows from the exhaust-air outlet 34 toward the rear side in the passenger compartment. However, the air may blow from the exhaust-air outlet 34 downward. In this case, the exhaust-air outlet 34 may be arranged adjacent to the conditioned-air outlet 33 in the axial direction Z1.

(4) In the above embodiments, the blowing unit 11 is disposed adjacent to the rear surface of the back part 1b of the seat 1. However, the blowing unit 11 may be disposed adjacent to a bottom surface of the bottom part 1a. In this case, the blowing unit 11 is disposed such that the axial direction Z1 of the fan shaft 17 corresponds to the vehicle top-bottom direction.

(5) The above embodiments are related with each other and may be partially combined as long as there is no harm in the combination. It should be noted that components configuring the above embodiments are not necessarily required except as clearly specified to be necessary and as considered to be obviously necessary in principle.

Such changes and modifications are to be understood as being within the scope of the present disclosure as defined by the appended claims.

What is claimed is:

1. An air conditioner for a vehicle seat, comprising:
a centrifugal fan having a fan shaft;
a first case that houses the fan and includes a fan inlet drawing air and a fan outlet blowing air; and
a second case that provides an inlet-side air passage connecting to the fan inlet and an outlet-side air passage connecting to the fan outlet, wherein
the inlet-side air passage is adjacent to the outlet-side air passage,
the inlet-side air passage includes:
an inside-air inlet drawing air from a surface of the vehicle seat into the inlet-side air passage, the inside-air inlet being arranged in a plane intersecting with an axial direction of the fan shaft;
a conditioned-air inlet introducing conditioned air from an air conditioning unit that performs air conditioning for a passenger compartment into the inlet-side air passage, the conditioned-air inlet being arranged in a plane parallel to the axial direction of the fan shaft; and
an inlet-side switching door that selectively opens or closes the inside-air inlet and the conditioned-air inlet;
the outlet-side air passage includes:
a conditioned-air outlet through which an air flowing in the outlet-side air passage flows to the surface of the vehicle seat;
an exhaust-air outlet through which an air flowing in the outlet-side air passage flows out of the second case away from the surface of the vehicle seat; and
an outlet-side switching door that selectively opens or closes the conditioned-air outlet and the exhaust-air outlet,
the fan outlet and the conditioned-air outlet are arranged along a blowing direction of air flowing out of the fan outlet, and
the inside-air inlet is proximate to the conditioned-air outlet in a direction perpendicular to the axial direction of the fan shaft.

2. The air conditioner for a vehicle seat according to claim 1, wherein
each of the inlet-side switching door and the outlet-side switching door is configured by a single plate door.

3. The air conditioner for a vehicle seat according to claim 2, further comprising:
an actuator operating the inlet-side switching door and the outlet-side switching door, wherein
the inlet-side switching door has a first door shaft and a first gear,
the outlet-side switching door has a second door shaft and a second gear,
the inlet-side switching door and the outlet-side switching door are adjacent to each other in a direction in which the first door shaft and the second door shaft extend, and
the inlet-side switching door and the outlet-side switching door are connected to each other through the first gear and the second gear.

4. The air conditioner for a vehicle seat according to claim 3, wherein
the actuator is a bimetal that is deformed depending on a temperature of air flowing in the second case.

5. The air conditioner for a vehicle seat according to claim 3, further comprising:
a controller controlling an operation of the actuator, wherein
the actuator is an electric motor.

6. The air conditioner for a vehicle seat according to claim 5, further comprising:
a temperature sensor that is disposed in the first case or the second case to detect a temperature of air, wherein
the controller sets positions of the inlet-side switching door and the outlet-side switching door depending on the temperature of the air detected by the temperature sensor.

7. The air conditioner for a vehicle seat according to claim 1, wherein
the conditioned-air outlet is located at an angle along the blowing direction of air from the fan outlet.

8. The air conditioner for a vehicle seat according to claim 1, wherein the first case is connected to the second case in the axial direction of the fan shaft.

9. The air conditioner for a vehicle seat according to claim 1, wherein
air flows from the first case to the second case in the axial direction of the fan shaft.

10. An air conditioner for a vehicle seat, comprising:
a centrifugal fan having a fan shaft;
a first case that houses the fan and includes a fan inlet drawing air and a fan outlet blowing air; and
a second case that provides an inlet-side air passage connecting to the fan inlet and an outlet-side air passage connecting to the fan outlet, wherein
the inlet-side air passage is adjacent to the outlet-side air passage,
the inlet-side air passage includes:
an inside-air inlet drawing air from a surface of the vehicle seat into the inlet-side air passage, the inside-air inlet being arranged in a plane intersecting with an axial direction of the fan shaft;
a conditioned-air inlet introducing conditioned air from an air conditioning unit that performs air conditioning for a passenger compartment into the inlet-side air passage, the conditioned-air inlet being arranged in a plane parallel to the axial direction of the fan shaft; and
an inlet-side switching door that selectively opens or closes the inside-air inlet and the conditioned-air inlet,
the outlet-side air passage includes:
a conditioned-air outlet through which an air flowing in the outlet-side air passage flows to the surface of the vehicle seat;
an exhaust-air outlet through which an air flowing in the outlet-side air passage flows out of the second case away from the surface of the vehicle seat; and
an outlet-side switching door that selectively opens or closes the conditioned-air outlet and the exhaust-air outlet,
the fan outlet and the conditioned-air outlet are arranged along a blowing direction of air flowing out of the fan outlet,
the conditioned-air outlet is arranged such that at least a part of a projection image of the conditioned-air outlet that is projected relative to the first case in a direction perpendicular to the axial direction of the fan shaft overlaps the fan outlet, and
the inside-air inlet is proximate to the conditioned-air outlet in the direction perpendicular to the axial direction of the fan shaft.

11. The air conditioner for a vehicle seat according to claim 10, wherein
the conditioned-air outlet is located at an angle along the blowing direction of air from the fan outlet.

12. The air conditioner for a vehicle seat according to claim 10, wherein
the first case is connected to the second case in the axial direction of the fan shaft.

13. The air conditioner for a vehicle seat according to claim 10, wherein
air flows from the first case to the second case in the axial direction of the fan shaft.

* * * * *